US006937313B2

(12) United States Patent
Park et al.

(10) Patent No.: US 6,937,313 B2
(45) Date of Patent: Aug. 30, 2005

(54) LIQUID CRYSTAL DISPLAY DEVICE IMPLEMENTING IMPROVED ELECTRICAL LINES AND THE FABRICATING METHOD

(75) Inventors: Sung-Il Park, Anyang-shi (KR); Keuk-Sang Kwon, Kumi-shi (KR); Kyong-Rak Lee, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 230 days.

(21) Appl. No.: 09/866,656

(22) Filed: May 30, 2001

(65) Prior Publication Data

US 2002/0093616 A1 Jul. 18, 2002

(30) Foreign Application Priority Data

May 31, 2000 (KR) ........................................ 2000-29725

(51) Int. Cl.[7] ............................................ G02F 1/1345

(52) U.S. Cl. ........................ 349/149; 349/151; 349/152

(58) Field of Search ................................ 349/149, 151, 349/152, 90, 80; 345/98, 90, 80

(56) References Cited

U.S. PATENT DOCUMENTS

| | | | | | |
|---|---|---|---|---|---|
| 5,463,230 | A | * | 10/1995 | Negoto et al. | 257/66 |
| 5,600,155 | A | * | 2/1997 | Wu | 257/72 |
| 5,739,880 | A | * | 4/1998 | Suzuki et al. | 349/110 |
| 5,745,090 | A | * | 4/1998 | Kim et al. | 345/90 |
| 5,748,179 | A | * | 5/1998 | Ito et al. | 349/152 |
| 5,864,377 | A | * | 1/1999 | Kim | 349/150 |
| 5,949,502 | A | * | 9/1999 | Matsunaga et al. | 349/40 |
| 6,429,908 | B1 | * | 8/2002 | Lim | 349/54 |
| 6,542,214 | B1 | * | 4/2003 | Hoshino | 349/149 |
| 6,614,500 | B2 | * | 9/2003 | Kim | 349/152 |
| 6,621,547 | B2 | * | 9/2003 | Kang | 349/151 |
| 6,639,589 | B1 | * | 10/2003 | Kim et al. | 345/206 |
| 2001/0026345 | A1 | * | 10/2001 | Park et al. | 349/149 |
| 2003/0189679 | A1 | * | 10/2003 | Choi et al. | 349/46 |
| 2004/0041779 | A1 | * | 3/2004 | Kang | 345/100 |

* cited by examiner

*Primary Examiner*—Toan Ton
*Assistant Examiner*—Mike Qi
(74) *Attorney, Agent, or Firm*—McKenna Long & Aldridge LLP

(57) ABSTRACT

A liquid crystal display device includes a liquid crystal panel including an upper substrate, and a lower substrate having a plurality of source pads and gate pads, the upper and lower substrates being attached using a sealant; a source PCB connected with the plurality of source pads such that the source PCB applies signals to the source pads; and a plurality of gate transmitting lines connecting the gate pads with the source pads such that gate signals including Vcom, Vgh, Vgl, Vcc, Gsp, Gsc, Goe, and Gnd are transmitted from the source PCB to the gate PCB via the gate transmitting lines, wherein one of the gate transmitting line has a resistance of below 30 Ω such that the line is used for transmitting a gate low voltage "Vgl".

24 Claims, 7 Drawing Sheets

LIQUID CRYSTAL DISPLAY DEVICE IMPLEMENTING IMPROVED ELECTRICAL LINES AND THE FABRICATING METHOD

This application claims the benefit of Korean Patent Application No. 2000-29725 filed on May 31, 2000, which is hereby incorporated by reference as if fully set forth herein.

BACKGROUND OF THE INVENTION

1. Field of the Invention

The present invention relates to a liquid crystal display (LCD) device, and more particularly, to a liquid crystal display device implementing improved configuration of electrical lines and a fabricating method thereof.

2. Discussion of the Related Art

Generally, a liquid crystal display (LCD) device includes an upper substrate, a lower substrate, and an interposed liquid crystal therebetween.

By now, an active matrix LCD (AM LCD) device having a plurality of switching elements and pixel electrodes, which are arranged in the form of a matrix on the lower substrate, is most widely used due to its high resolution and superiority in displaying moving video data. For the switching element, a thin film transistor (TFT) including a source electrode, a drain electrode, and a gate electrode is widely used. A gate line, a data line (which cross the gate line) and an insulating layer between the gate and data lines are further formed on the lower substrate of the AM LCD device. The gate electrode is electrically connected to the gate line which transmits scanning signals, whereas the source electrode is electrically connected to the data line, which transmits data signals. In addition, a pixel electrode is formed on each pixel region of the lower substrate. The pixel electrode electrically contacts the drain electrode of the thin film transistor.

On the upper substrate, a common electrode made from a transparent conductive material is formed. In case of a color LCD device, a color filter is further formed between the upper substrate and the common electrode. The above-mentioned lower substrate and the upper substrate are attached to each other using a sealant therebetween, and then a liquid crystal is interposed between the upper and lower substrates such that a liquid crystal display panel is produced.

In the above-mentioned AM LCD device, the scanning signal applied to the gate electrode is properly controlled such that an electric signal is selectively applied to the liquid crystal via the data line. Since the electric signal applied to the liquid crystal is selectively variable, various gray levels are displayed by the AM LCD device.

The typical LCD device has a drive IC (Integrated Circuit) on its lower substrate. The drive IC serves to apply electric signals to each electric line formed on the lower substrate. To install the drive IC o the lower substrate, various methods such as chip on board (COB), chip on glass (COG), and tape carrier package (TCP) methods are adopted.

The COB method is conventionally adopted for a segment type LCD device, or an LCD panel having a low resolution. Since the segment type LCD device or the low resolution LCD panel uses a small number of leads, the drive IC thereof also has a small number of leads. Therefore, the drive IC thereof is first installed on a printed circuit board (PCB) having a plurality of leads, and the leads of the PCB are connected to the LCD panel via a suitable method, which is relatively simple.

However, as the LCD devices move towards high resolution, a great number of leads are needed for the drive IC. When the drive IC has a great number of leads, it is difficult to install the drive IC on the above-mentioned PCB.

In another method, the COG method, the drive IC is directly installed on the LCD panel without interposing the PCB. Therefore, the connection between the drive IC and the LCD panel is stable, and a small or minute pitch is acceptable for the installation of the drive IC. The COG method employs a multi-layered flexible printed circuit (FPC) instead of the PCB. The multi-layered FPC contacts the LCD panel via an anisotropic conductive film (ACF) and transmits input signals to the drive IC.

The above-mentioned COG method has advantages of low cost and high stability. However, in the COG method, the LCD panel requires an additional area in the pad to install the drive IC. In addition, when the COG method is adopted for the LCD panel, it is difficult to repair the drive IC or terminal lines of the LCD panel, should problems arise.

In another method, the TCP method, the drive IC is installed on a polymer film. The TCP method is widely used for LCD devices as well as mobile phones that need small, thin, and light electrical packages.

FIG. 1 is a cross-sectional view illustrating a typical TCP 34 installed in an LCD device having a lower substrate 20 and an upper substrate 10. For the TCP 34, a drive IC (integrated circuit) 17 is installed on a polymer film 19. Then, the polymer film 19 is connected to the lower substrate 20 and a printed circuit board (PCB) 31 using an anisotropic conductive film (ACF) 18. At this point, an upper substrate 10 is attached on the lower substrate 20. The above-mentioned TCP applies signals to both ends or just one end of the data line (not shown) and a gate line (not shown) on the lower substrate 20, i.e., an array substrate for the LCD device operation.

FIG. 2 is a plan view illustrating an LCD device 1 having the TCP 34. As shown, the LCD device 1 includes a lower substrate 20 on which a gate line 26 and a data line 28 are formed in a crossing relationship, and an upper substrate 10 attached to the lower substrate 20. Around the LCD device 1, a gate PCB 31 and a source PCB 33 are arranged to apply exterior signals to the LCD device. The gate PCB 31 and the source PCB 33 are connected to each other via a flexible printed circuit (FPC) 37 disposed outside of the LCD device 1. The gate PCB 31 and the source PCB 33 are connected to the LCD device 1 via a gate TCP 34 and a source TCP 36, respectively. The gate TCP 34 has a gate drive circuit (reference 17 of FIG. 1), which applies scanning signals so the gate line 26. Whereas, the source or data TCP 36 has a data drive circuit (reference 17 of FIG. 1), which applies video signals to the data line 28.

At this point, exterior signals for controlling the gate drive IC on the gate TCP 34 are applied to the gate PCB 31 from the source PCB 33 using the above-mentioned FPC 37. In other words, the data drive circuit on the source TCP 36 receives the video signals directly from the source PCB 33. However, the gate drive circuit on the gate TCP 34 receives the scanning signals from the gate PCB 31 via the source PCB 33. To transmit scanning signals from the source PCB 33 to the gate PCB 31, the FPC 37 is used.

Specifically, the FPC 37 transmits the gate signals including Vcom, Vgh, Vgl, Vcc, Gsp, Gsc, Goe, and Gnd to the gate PCB 31. Among the various gate signals, a gate high voltage "Vgh" and a gate low voltage "Vgl" directly pass through the gate line, and a common voltage "Vcom" is applied to the upper substrate of the LCD panel. Whereas, "Gsc" and "Goe" serve to control the above-mentioned signals passing through the gate line, and "Gsp" serves to control the drive IC.

As mentioned above, for the above-mentioned configuration, the FPC 37 is additionally used to transmit gate control signals such as "Gsc" and "Goe". The FPC 37 causes an increase of material cost for fabricating the LCD device. Moreover, a soldering error may occur where the FPC 37 connect to the gate and source PCB.

To avoid the above-mentioned problem, a connecting wire has been recently adopted. Instead of the FPC formed outside of the lower substrate, a plurality of connecting wires are directly patterned on the lower substrate such that the above-mentioned gate signals are transmitted there-through. FIG. 3 shows an improved connecting wire 40 formed inside of an LCD panel 50.

As shown, gate transmitting wires 40 are formed on the lower substrate 20 such that the gate PCB 31 is electrically connected to the source PCB 33 via the gate transmitting wire 40. The gate transmitting wires 40 are preferably made of aluminum (Al), molybdenum (Mo), chromium (Cr), alloys thereof, and the like.

FIG. 4 is an exploded plane view of a portion "A" of FIG. 3. As shown, the gate transmitting wires 40 preferably include at least eight electric wires and transmit gate signals from the source PCB 33 of FIG. 3 to the gate PCB 31 of FIG. 3. The gate signals include Vcom, Vgh, Vgl, Vdd, Gsp, Gsc, Goe, and Gnd. Each gate transmitting wires 40 is electrically connected to gate and source pads 28 and 30, which respectively serve as output and input terminals of the gate transmitting wires 40.

In addition, dummy pads (not shown) are preferably formed in gaps between adjacent gate pads 28 and between adjacent source pads 30. When the gate transmitting wires 40 respectively transmit different signals having different voltages, the dummy pads prevent an abnormal electrical interaction between the adjacent gate transmitting wires.

As mentioned above, the abnormal electrical interaction occurs between adjacent addressing lines. For example, a pixel of an LCD device is affected by adjacent pixels which deteriorate the display quality. To examine a display quality of the above-mentioned LCD panel, a cross talk test is usually performed. With reference to FIG. 5, a typical cross talk test is explained.

As shown, a rectangular window pattern 63 is displayed at a center of a display area 61 of the LCD device (reference 50 of FIG. 4). The window pattern 63 is adjusted to be black, whereas peripheries of the window pattern 63 are adjusted to be gray. Then, upper and lower peripheries of the windows 63 maintain the same gray level, while right and left peripheries of the window pattern 63 are changed to have a different gray level. Thus, the right and left peripheries of the window pattern 63 are affected by the window pattern 63 such that the different gray level is displayed thereon.

Specifically, during first and second scanning periods "t1" and "t3", only gray is displayed on the display area 61, while the black window pattern 63 is displayed together with the gray level (surrounding the back window pattern) during a second scanning period "t2". As mentioned above, the black window pattern 63 affects the right and left peripheries thereof during the second scanning period "t2". Therefore, the right and left peripheries of the window pattern 63 show the different gray level from the original gray level of the first or third scanning time "t1" or "t3 ". The above-mentioned different gray level in the right and left peripheries of the window pattern 63 is called a horizontal cross-talk. The horizontal cross-talk is measured by comparing a first luminance of the original gray level with a second luminance of the changed gray level. If there is a large difference between the first and second luminance, the difference is recognized as a poor display quality.

The above-mentioned horizontal cross-talk is caused by the following reasons: a distortion in a common signal due to a coupling between a data signal and the common signal; a distortion in signals due to a resistance of the pixel electrode or a contact resistance of the pads; a low current capacity of the source drive IC or the data drive IC; and a low capacitance of the thin film transistor.

Among the various reasons, a distortion in the gate low voltage "Vgl" is the main reason for causing the horizontal cross-talk of the conventional LCD device having the gate transmitting wire formed on the lower substrate. The above-mentioned gate low voltage "Vgl" is applied to the entire gate transmitting wires (reference 40 of FIG. 4). However, the conventional gate transmitting wire 40 of FIG. 4 does not have sufficient width and length for the gate low signals to pass there-through without some distortion. Therefore, the gate low voltage "Vgl" is heavily distorted such that a data voltage is affected thereby. An operating voltage for the liquid crystal is determined by a difference between a data voltage and a common voltage. Then, because of the above-mentioned distortion of the gate low voltage "Vgl", the operating voltage for the liquid crystal is significantly changed such that a visible horizontal cross-talk occurs.

FIGS. 6A and 6B show first and second signal waveforms around the window pattern 63 of FIG. 5. In FIG. 6A, a voltage is directly applied from the source PCB (reference 33 of FIG. 3) to the gate PCB (reference 31 of FIG. 3). In FIG. 6B, a voltage is applied from the source PCB to the gate PCB via the gate transmitting line (reference 40 of FIG. 3). In both of the first and second cases, the gate low voltage "Vgl" is measured along the window pattern (reference 63 of FIG. 5), and along upper and lower boundaries thereof. Waveforms of the gate low voltage "Vgl" is measured along a vertical line 60, which is vertically across the display area 61 including boundaries 64 and the window pattern 63 (see FIG. 5).

As shown in FIG. 6A of the first case, there is a small gate low voltage difference between a boundary voltage 65*a* or 65*b* measured along the boundaries 64 and a periphery voltage 65 measured along the peripheries of the window pattern 63. Specifically, the voltage difference between the boundary voltage 65*a* or 65*b* and the periphery voltage 65 is about 4.2 mV. However, as shown in FIG. 6B of the second case, there is a very large gate low difference of about 67 mV between the boundary voltage 65*a* or 65*b* and the periphery voltage 65.

Thus, the gate transmitting line 40 of FIG. 3 has some resistance, which affects the gate low voltage "Vgl" such that the gate low voltage "Vgl" is distorted.

SUMMARY OF THE INVENTION

Accordingly, the present invention is directed to an LCD device that substantially obviates one or more of the problems due to limitations and disadvantages of the related art.

An object of the present invention is to provide an LCD device having improved electrical lines.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages, the present invention provides a liquid crystal display device comprises a liquid crystal panel including a substrate, the substrate having a plurality of source pads and gate pads; a first printed circuit board connected to the plurality of source pads, the first printed circuit board applying signals to the source pads; a second printed circuit board connected to the plurality of gate pads, the second printed circuit board applying signals to the gate pads; and a plurality of gate transmitting lines formed directly on the substrate and connecting the gate pads with the source pads, the plurality of gate transmitting lines transmitting signals from the first printed circuit board to the second printed circuit board via the gate transmitting lines.

In another aspect, an liquid crystal display device includes a liquid crystal panel including an upper substrate and a lower substrate having a plurality of source pads and gate pads, the upper and lower substrates being attached using a sealant; a source PCB connected to the plurality of source pads such that the source PCB applies signals to the source pads; and a plurality of gate transmitting lines connecting the gate pads to the source pads such that gate signals including Vcom, Vgh, Vgl, Vcc, Gsp, Gsc, Goe, and Gnd are transmitted from the source PCB to the gate PCB via the gate transmitting lines, wherein one of the gate transmitting lines has a resistance of below 30 Ω such that the line is used for transmitting a gate low voltage "Vgl".

At least eight gate transmitting lines are used for transmitting the gate signals.

The device further includes a plurality of dummy pads between adjacent source pads and between adjacent gate pads.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

For the preferred embodiment of the present invention, additional FPC is not used. Instead of the FPC, eight gate transmitting lines are directly formed on an array substrate. Then, a resistance of a gate low voltage transmitting line is adjusted such that a distorted gate low voltage "Vgl" is prevented.

Figure 7:
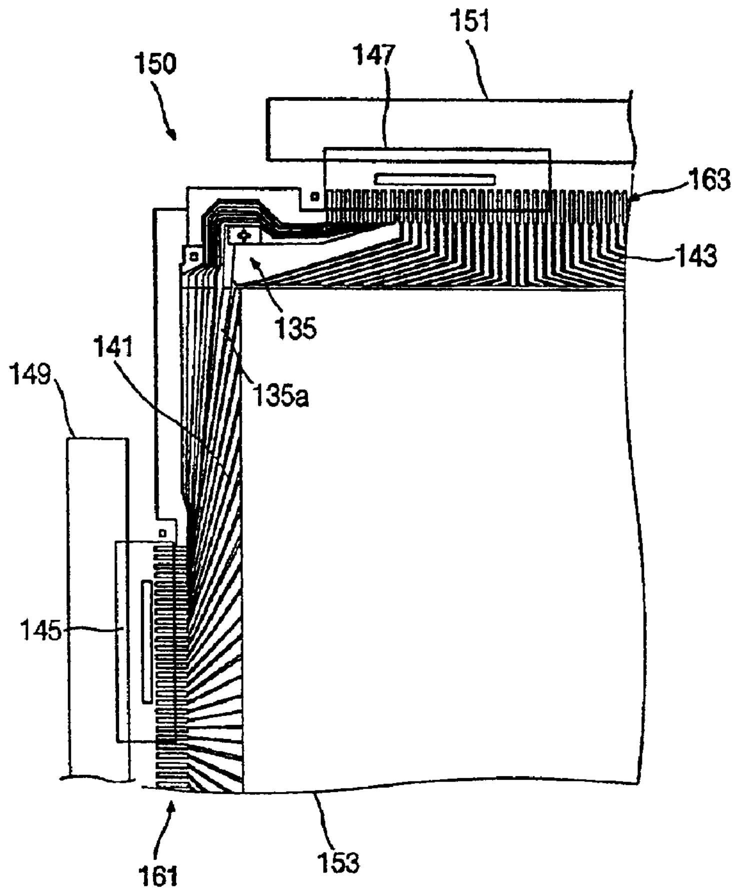
FIG. 7 is a plan view illustrating an LCD device according to the preferred embodiment of the present invention.

FIG. 7 is a plan view illustrating an LCD device 150 according to the preferred embodiment of the present invention. As previously mentioned, the gate low voltage transmitting line 135*a* has a relatively small resistance such that just a little distortion occurs in the gate low voltage "Vgl". Various methods may be adopted to achieve the low resistive line, for example, using a material of a small specific resistance, using a short line, or using a wide line for the gate transmitting lines or wires 135.

Figure 8:
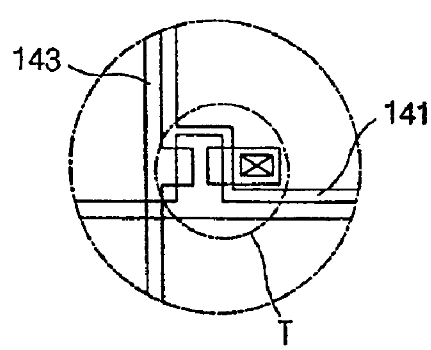
FIG. 8 is an exploded plan view of a thin film transistor "T"

As shown in FIG. 7, the LCD device 150 includes a liquid crystal panel 153, a gate PCB 149, and a source PCB 151. The liquid crystal panel 153 has a gate line 141, a data line 143, and a thin film transistor "T" of FIG. 8 disposed at a crossing portion between the gate and data lines 141 and 143. The gate PCB 149 has a gate drive IC 145 applying a scanning signal to the gate line 141, whereas the source PCB 151 has a source drive IC 147 applying data signals to the data line 143. In addition, on a corner of the liquid crystal panel 153, the eight gate transmitting lines 135 are formed. The gate signals including, for example, Vcom, Vgh, Vgl, Vcc, Gsp, Gsc, Goe, and Gnd are respectively transmitted from the source PCB 151 to the gate PCB 149 via the eight gate transmitting lines 135.

The gate transmitting lines 135 connect gate pads 161 to source pads 163. The gate and source pads 161 and 163 are respectively connected to the gate drive IC 145 and the source drive IC 147. Dummy pads (not shown) are preferably formed in gaps between adjacent gate pads 161 and between adjacent source pads 163. When the gate transmitting lines 135 respectively transmit different signals having different voltages, the dummy pads prevent an abnormal electrical interaction between the adjacent gate transmitting wires.

At this point, each of the gate transmitting lines 135 has a different length according to its respective position thereof. However, each gate transmitting line 135 except for the gate low voltage transmitting line 135*a* preferably has a first resistance of about 100 Ω. Specifically, the gate low voltage transmitting line 135*a* through which the gate low voltage signal "Vgl" transmits preferably has a second resistance of below 30 Ω. Then, the distortion of the gate low voltage "Vgl" due to the relatively high resistance of the gate transmitting line is prevented. When the resistance of the gate low voltage transmitting line 135*a* is below 30 Ω, a cross talk of the LCD panel 153 is invisible or substantially invisible to a user.

To achieve the above-mentioned low resistance, the gate low voltage transmitting line 135*a* preferably has a wide cross-section. As previously mentioned, various other methods may be applied to achieve the low resistive line.

Figure 1:
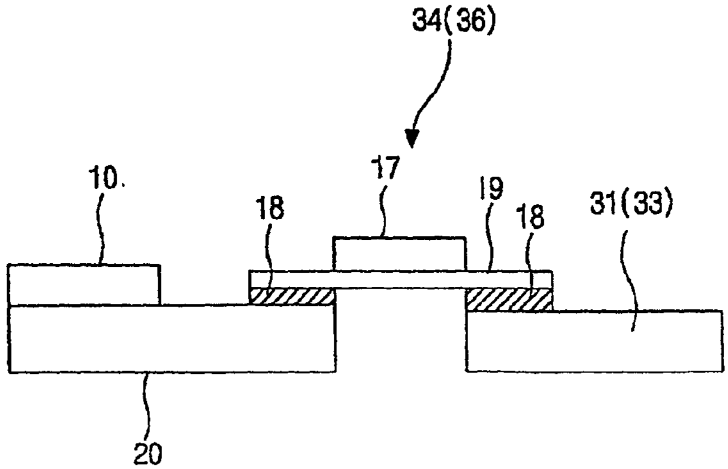
FIG. 1 is a cross-sectional view illustrating a typical TCP.
Figure 2:
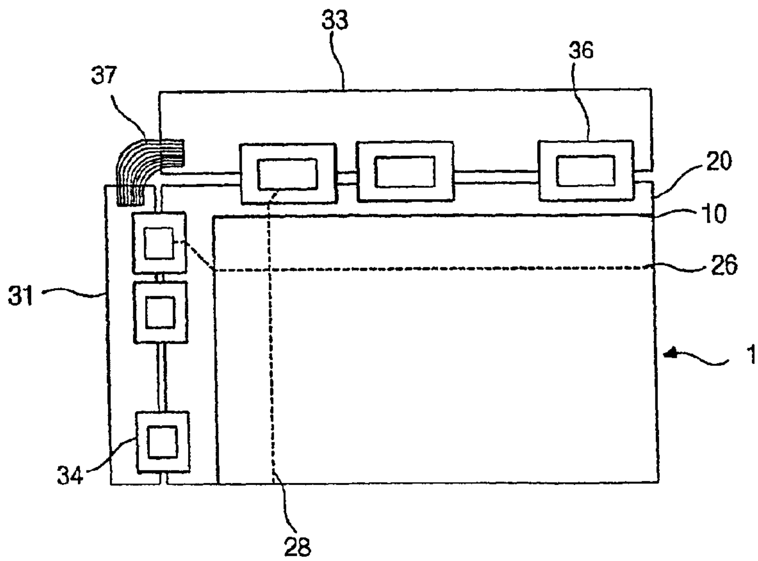
FIG. 2 is a plan view illustrating a typical LCD device having the TCPs.
Figure 3:
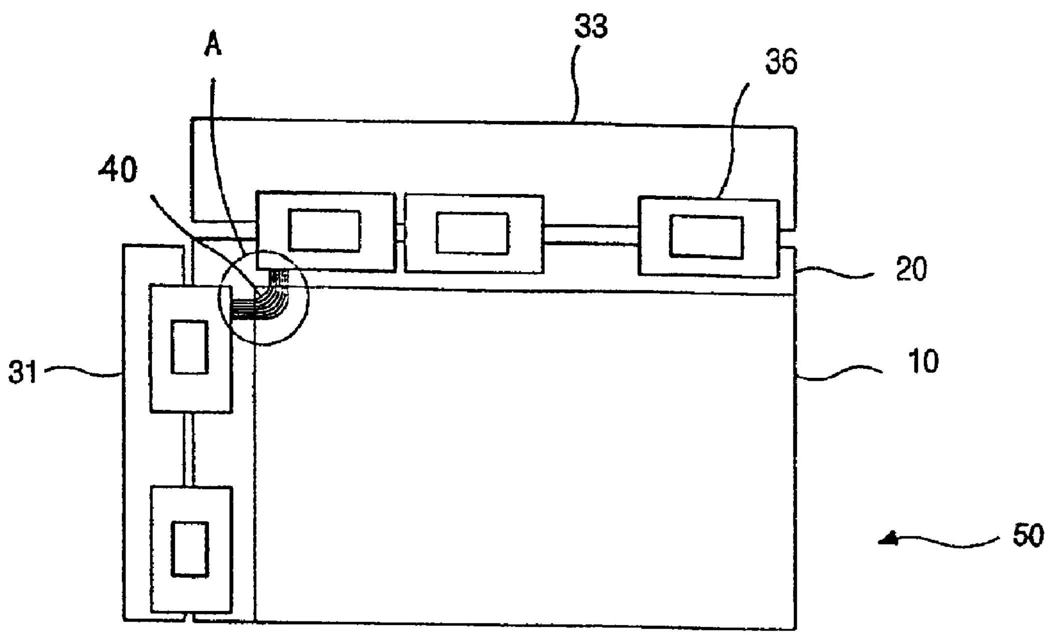
FIG. 3 is a plan view illustrating an LCD device according to the related art.
Figure 4:
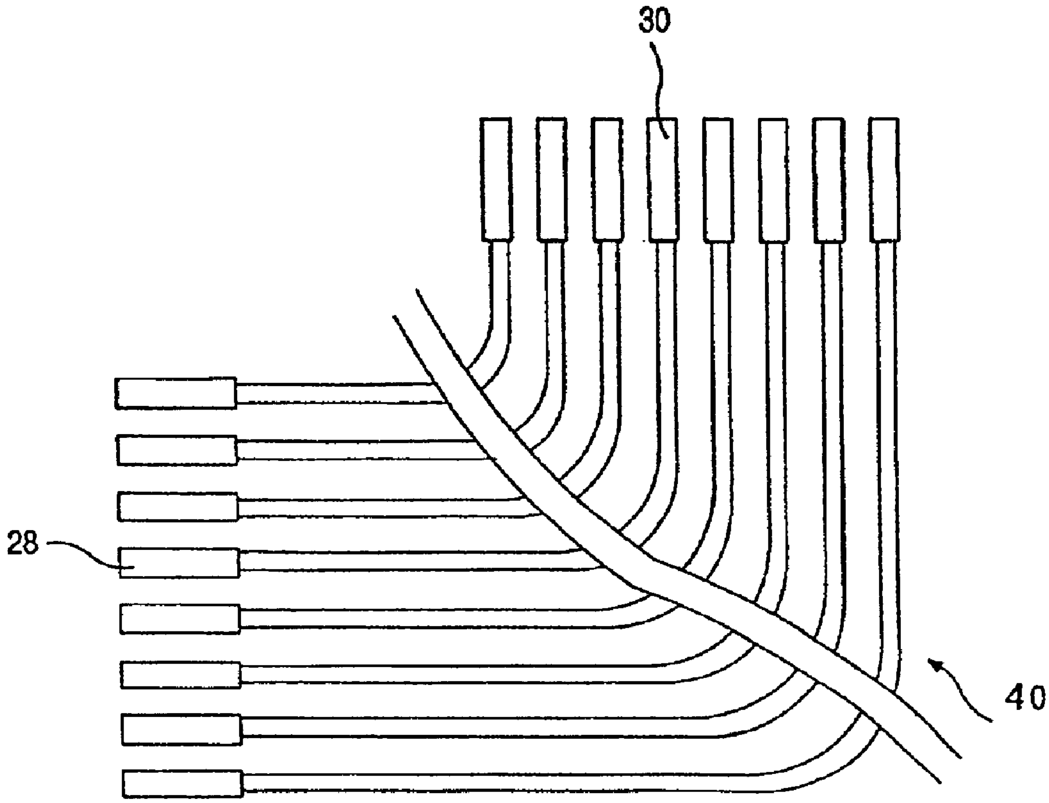
FIG. 4 is an exploded plane view of a portion "A" of FIG. 3.
Figure 5:
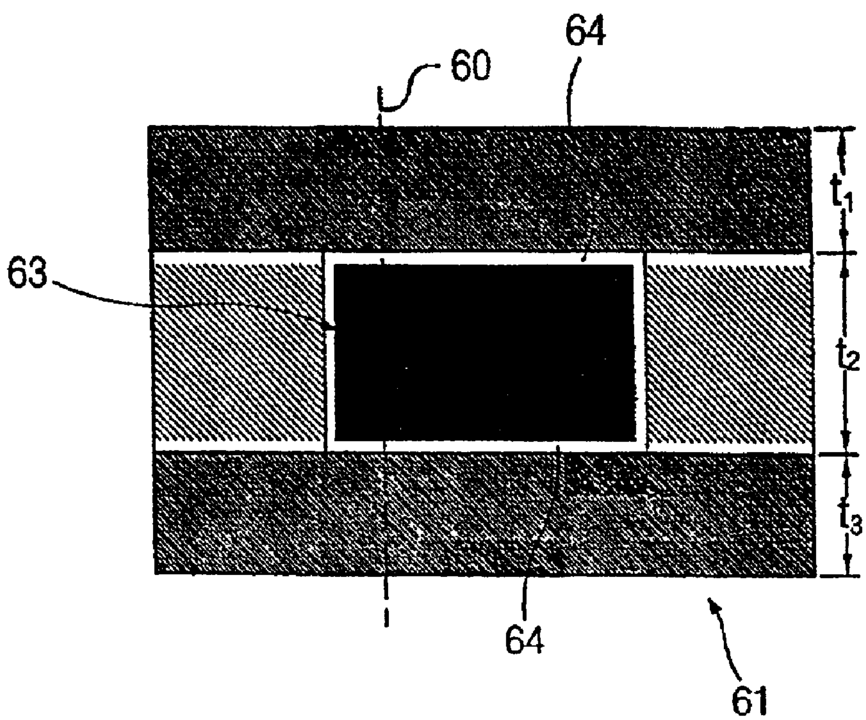
FIG. 5 is a plan view illustrating a window pattern display used for a cross-talk test.
Figure 6A:
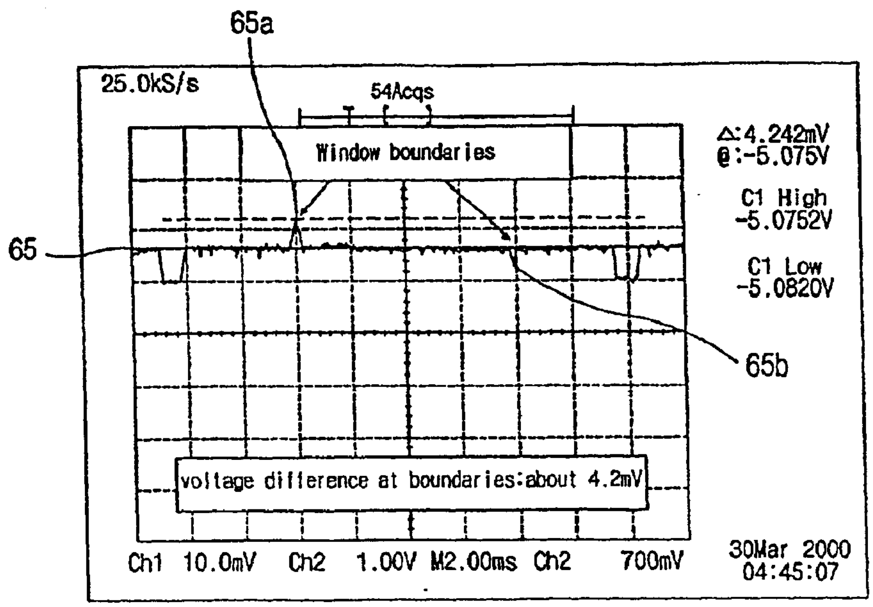
FIGS. 6A and 6B are graphs of waveforms achieved when the cross-talk test is applied to a conventional LCD device.
Figure 6B:
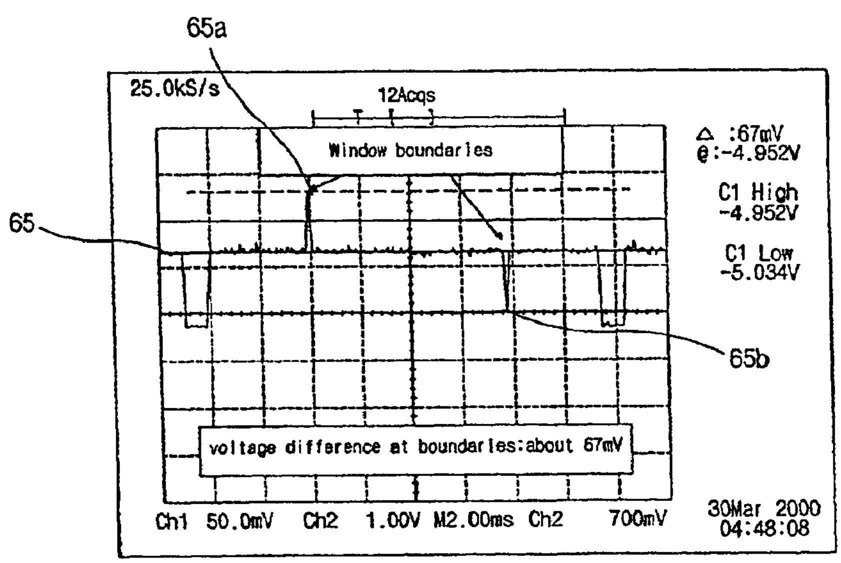
Figure 9:
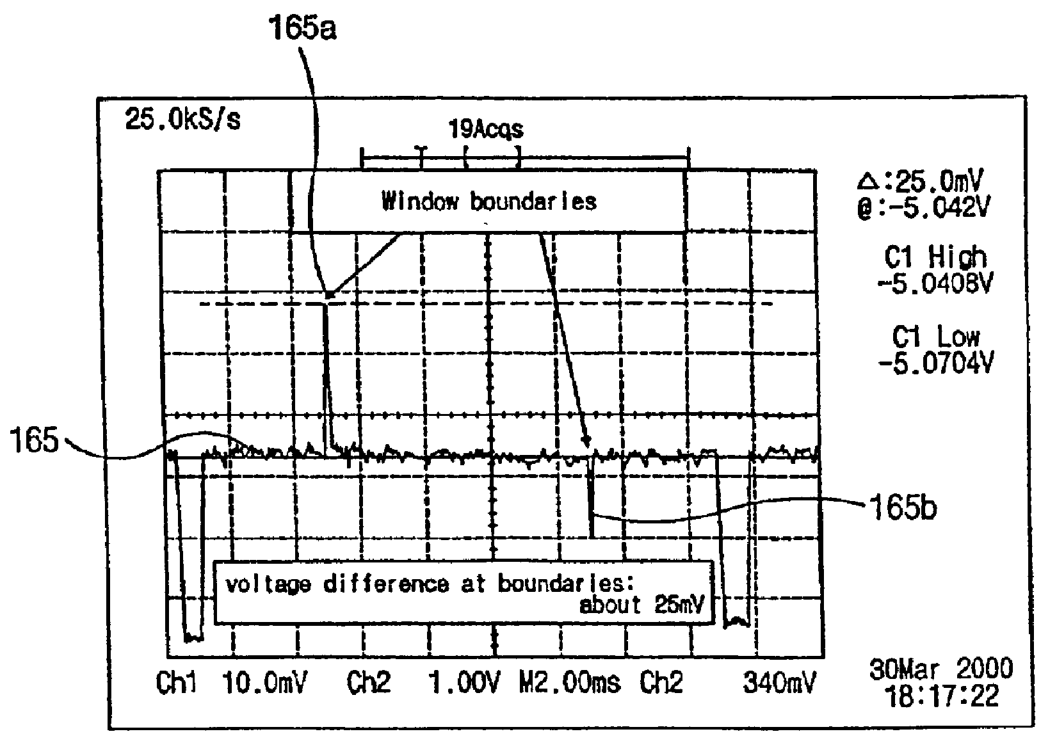
FIG. 9 is a graph of waveforms achieved when the cross-talk test is applied to the LCD device according to the preferred embodiment.

FIG. 9 is a graph of gate low voltage waveforms achieved when a cross-talk test shown in FIG. 5 is applied to the LCD device according to the preferred embodiment. Specifically, FIG. 9 is a display output produced by a test equipment for the cross-talk test. Here, the gate low voltage transmitting line 135*a* of FIG. 7 is adjusted to have a resistance of about 20 Ω. As shown, a voltage difference between a boundary voltage 165*a* or 165*b* and a periphery voltage 165 is about 25 mV, which is relatively smaller than a conventional voltage difference of 67 mV shown in FIG. 6B. Because of the low resistive gate low voltage transmitting line 135*a*, the cross-talk is decreased.

It will be apparent to those skilled in the art that various modifications and variation can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a liquid crystal panel including a first substrate and a second substrate, the first substrate having a plurality of source pads and gate pads, the first and second substrates being attached;

a first printed circuit board connected to the plurality of source pads, the first printed circuit board applying signals to the source pads;

a second printed circuit board connected to the plurality of gate pads, the second printed circuit board applying signals to the gate pads; and a plurality of gate transmitting lines connecting gate pads with source pads, the plurality of gate transmitting lines transmitting signals from the first printed circuit board to the second printed circuit board via the gate transmitting lines, wherein a first gate transmitting line of the plurality of gate transmitting lines has a first resistance, wherein the plurality of gate transmitting lines other than the first gate transmitting line have a second resistance, and wherein the first resistance is less than the second resistance.

2. The liquid crystal display device according to claim 1, wherein the plurality of gate transmitting lines include at least eight signal lines for transmitting signals from the first printed circuit board to the second printed circuit board.

3. The liquid crystal display device according to claim 1, wherein the plurality of gate transmitting lines include common voltage signal line.

4. The liquid crystal display device according to claim 1, wherein the plurality of gate transmitting lines includes a gate high voltage signal line.

5. The liquid crystal display device according to claim 1, wherein the plurality of gate transmitting lines a includes a gate low voltage signal line.

6. The liquid crystal display device according to claim 1, wherein the plurality of gate transmitting lines includes a first control signal line and a second control signal line.

7. The liquid crystal display device according to claim 1, wherein the plurality of gate transmitting lines includes a power line and a ground line.

8. The liquid crystal display device according to claim 1, wherein the plurality of gate transmitting lines includes a drive IC control signal line.

9. The liquid crystal display device according to claim 1, wherein the plurality of gate transmitting lines includes a common voltage signal line, a gate high voltage signal line, a gate low voltage signal line, first and second control signal lines, a power line and a ground line.

10. The liquid crystal display device of claim 1, further comprising a plurality of dummy pads between adjacent source pads and between adjacent gate pads.

11. The liquid crystal display device of claim 1, further comprising a plurality of dummy pads between adjacent gate pads.

12. The liquid crystal display device of claim 1, further comprising a plurality of dummy pads between adjacent source pads.

13. The liquid crystal display device of claim 1, wherein the plurality of gate transmitting lines are formed directly on the first substrate.

14. The liquid crystal display device according to claim 1, wherein the first resistance is below 30Ω.

15. The liquid crystal display device according to claim 1, wherein the second resistance is about 100Ω.

16. The liquid crystal display device according to claim 1, wherein a gate low voltage is transmittable by the first gate transmitting line.

17. A liquid crystal display device, comprising:

a liquid crystal panel including a substrate, the substrate having a plurality of source pads and gate pads;

a first printed circuit board connected to the plurality of source pads, the first printed circuit board applying signals to the source pads;

a second printed circuit board connected to the plurality of gate pads, the second printed circuit board applying signals to the gate pads; and a plurality of gate transmitting lines formed directly on the substrate and connecting the gate pads with the source pads, the plurality of gate transmitting lines transmitting signals from the first printed circuit board to the second printed circuit board via the gate transmitting lines, wherein one of the plurality of gate transmitting lines has a first resistance and wherein the others of the plurality of gate transmitting lines has a second resistance greater than the first resistance.

18. The liquid crystal display device according to claim 17, wherein the plurality of gate transmitting lines include at least eight signal lines for transmitting signals from the first printed circuit board to the second printed circuit board.

19. The liquid crystal display device according to claim 17, wherein the plurality of gate transmitting lines includes a gate high voltage signal line and a gate low voltage signal line.

20. The liquid crystal display device according to claim 17, wherein the plurality of gate transmitting lines includes a common voltage signal line, a gate high voltage signal line, a gate low voltage signal line, first and second control signal lines, a power line and a ground line.

21. The liquid crystal display device according to claim 17, further comprising a plurality of dummy pads between adjacent gate pads.

22. The liquid crystal display device according to claim 17, further comprising a plurality of dummy pads between adjacent source pads.

23. A method of making a liquid crystal display device, comprising:

forming a liquid crystal panel including a first substrate and a second substrate, the first substrate having a plurality of source pads and gate pads, the first and second substrates being attached;

forming a first printed circuit board connected to the plurality of source pads, the first printed circuit board applying signals to the source pads;

forming a second printed circuit board connected to the plurality of gate pads, the second printed circuit board applying signals to the gate pads; and forming a plurality of gate transmitting lines directly on the substrate and connecting the gate pads with the source pads, the plurality of gate transmitting lines transmitting signals from the first printed circuit board to the second printed circuit board via the gate transmitting lines, wherein one of the plurality of gate transmitting lines has a first resistance and wherein the others of the plurality of gate transmitting lines has a second resistance greater than the first resistance.

24. The method according to claim 23, wherein the first resistance is below 30 Ω, wherein a gate low voltage is transmittable by the one of the gate transmitting lines.

* * * * *